United States Patent Office 2,822,317
Patented Feb. 4, 1958

2,822,317

AQUEOUS IRON-ASCORBIC ACID PREPARATION

John J. Gulesich, Philadelphia, and Joseph A. Marlino, Secane, Pa., assignors to Smith, Kline & French Laboratories, Philadelphia, Pa., a corporation of Pennsylvania No Drawing. Application December 12, 1955
Serial No. 552,257

6 Claims. (Cl. 167—81)

This invention relates to a stable, liquid iron-ascorbic acid preparation which is useful as a hematinic and, more particularly, relates to a stable aqueous iron-ascorbic acid preparation.

The preparation of this invention is useful in treating various hypochromic anemias associated with iron deficiency, such as those caused by blood loss, poor iron absorption of orally administered iron or inadequate dietary intake of iron. In addition, the preparation of this invention is useful as a vehicle for the preparation of hematinics which are effective in treating other anemias as well as the iron-deficiency anemias which are the prime target of this medicament. Such general hematinic suspensions or solutions include added medicaments or nutritional adjuvants such as cyanocobalamin, folic acid or various liver and stomach extracts.

The preparation of this invention may be supplemented further with vitamins in order to treat the vitamin deficiencies which often accompany anemias. Of particular interest are the B complex vitamins, including thiamine, riboflavin, pyridoxine, pantothenic acid and niacinamide. Other vitamin supplements include, for example, vitamin A and vitamin D.

The absorption of iron from the gastrointestinal tract is recognized to be aided by the presence of l-ascorbic acid (vitamin C). Many pharmaceutical products are on the market containing these two medicaments in dry form, filled into a hard gelatin capsule or tabletted. The preparation of a stable aqueous liquid product containing l-ascorbic acid and ferrous sulfate was an old pharmaceutical problem which defied solving prior to this invention. Liquid forms of pharmaceutical products are particularly valuable for oral administration to infants, children and geriatric patients. Many adult patients prefer liquid preparations over tablets or capsules.

The instability of l-ascorbic acid in the presence of oxygen is well-known. This vitamin is known to be very unstable in aqueous vehicles due to its rapid autoxidation. Further, the presence of metallic ions, such as ferrous or cuprous ions speeds autoxidation of l-ascorbic acid greatly, degradation being particularly rapid in an acid medium. Ascorbic acid with ferrous compounds also forms various complexes, such as ferrous ascorbate, and these complexes are extremely unstable.

Unexpectedly the preparation of this invention provides a liquid, aqueous preparation containing l-ascorbic acid and a ferrous salt which has satisfactory stability. The preparation is suitable for oral use and is unusually palatable.

The preparation in accordance with this invention has as its essential ingredients a non-toxic ferrous salt, a polyhydric alcohol, l-ascorbic acid and water. Exemplary of non-toxic ferrous salts are ferrous sulfate, ferrous lactate, ferrous gluconate, ferrous succinate and ferrous complex salts, such as ferrous glutamate and ferrous choline citrates. The preferred salt is ferrous sulfate. The percentage of ferrous salt present is limited by the practicalities of dosage. It is preferred to have from about 0.1 to about 12%, advantageously from about 2% to about 8%, by weight of ferrous salt present in the preparation.

The polyhydric alcohols will be derived from sugars and have from 5 to 6 carbon atoms. The polyhydric alcohol must be soluble to the extent of at least 0.15 gm. per cc. of water at 25° C. Exemplary are alcohols of the formula $C_6H_{14}O_6$ and having the desired solubility as, for example, sorbitol or mannitol. Exemplary of the 5-carbon atom polyhydric alcohols having a suitable solubility is arabitol. It is preferred to use sorbitol. Sorbitol in the commercial form known as "Sorbo" (Atlas) which is 70% aqueous sorbitol has been found to be very satisfactory. The percentage by weight of the polyhydric alcohol contained in the preparation will be from about 15% to about 90%, about 60% to about 75% being the preferred range.

The l-ascorbic acid may be present in the free acid form or in the form of a derivative such as, for example, ascorbyl palmitate. Where used in the specification and claims, the term "l-ascorbic acid" is intended to include the free acid form of l-ascorbic acid as well as derivatives thereof. The percentage by weight of l-ascorbic acid in the preparation will preferably be from about 0.1% to about 15%, about 0.5% to about 4% being the most advantageous range.

The water will be present in the preparation in an amount to bring the total weight of the completed preparation to 100%.

It is apparent that other metallic compounds may be added to this basic preparation to advantage, such as cobaltous chloride, cuprous sulfate, molybdenum oxide and calcium phosphate. Other medicaments also may be added, such as folic acid, various forms of cyanocobalamin, liver or stomach extracts. These adjuncts may be added in such forms as to form suspensions; however, if it is to advantage to maintain a clear preparation, the additive material must obviously be soluble in the basic preparation of the invention.

If desired, pharmaceutical additives, such as flavorings, preservatives and dyes may be added to attain a commercially attractive preparation.

The preparation of this invention containing the essential ingredients with the adjuncts has a pH in the range of from about 2.0 to about 3.5. Very little drifting of pH occurs and no added buffers are required. The stability of the preparation of this invention is surprising in view of its pH range since, as pointed out above, the autoxidation of ascorbic acid in the presence of metallic salts is particularly rapid in an acid medium. Indeed, where the addition of adjuncts causes the pH to rise above about 3.5, it is desirable to add a buffer to keep the pH within the range of about 2.0 to about 3.5 to prevent decomposition of the l-ascorbic acid. Exemplary of satisfactory buffer systems are citric acid-sodium citrate and citric acid-sodium biphosphate.

Preparations in accordance with this invention are readily made using simple techniques well known to the art. Preferably the ferrous sulfate is first placed in solution in a portion of the water and the ascorbic acid and polyhydric alcohol added. Sufficient water can then be added to bring the preparation to the desired volume. Alternatively, it is satisfactory to first make an aqueous polyhydric alcohol solution and then add the ferrous salt and the ascorbic acid to this solution. Any desired adjuncts may be added to the preparation subsequently.

The invention will be further clarified by the following specific examples of preparations in accordance with this invention.

Example 1

| | | |
|---|---|---|
| Ascorbic acid, U. S. P. | gm | 13.0 |
| Ferrous sulfate, U. S. P. | gm | 12.0 |
| Sorbitol | gm | 60.0 |
| Distilled water, q. s. to 100.0 ml. | | |

Example 2

| | | |
|---|---|---|
| Ascorbic acid, U. S. P. | gm | 0.5 |
| Ferrous sulfate, U. S. P. | gm | 3.0 |
| Sorbitol | gm | 20.0 |
| Distilled water, q. s. to 100.0 ml. | | |

Example 3

| | | |
|---|---|---|
| Ascorbic acid, U. S. P. | gm | 4.0 |
| Ferrous sulfate, U. S. P. | gm | .5 |
| Sorbitol | gm | 75.0 |
| Distilled water, q. s. to 100.0 ml. | | |

Example 4

| | | |
|---|---|---|
| Ascorbic acid, U. S. P. | gm | 1.0 |
| Ferrous lactate hydrate | gm | 6.0 |
| "Sorbo" (70% sorbitol-30% water), q. s. to 100.0 ml. | | |

Example 5

| | | |
|---|---|---|
| Ascorbic acid, U. S. P. | gm | 2.5 |
| Ferrous gluconate, N. F. | gm | 8.0 |
| Distilled water | ml | 10.0 |
| "Sorbo" (70% sorbitol-30% water), q. s. to 100.0 ml. | | |

Example 6

| | | |
|---|---|---|
| Ascorbic acid, U. S. P. | gm | 1.0 |
| Ferrous sulfate, U. S. P. | gm | 6.0 |
| Mannitol | gm | 20.0 |
| Distilled water, q. s. to 100.0 ml. | | |

Example 7

| | | |
|---|---|---|
| Ascorbic acid, U. S. P. | gm | 1.0 |
| Ferrous sulfate, U. S. P. | gm | 6.0 |
| Thiamin hydrochloride | gm | 0.06 |
| Riboflavin | gm | 0.04 |
| Niacinamide | gm | 0.66 |
| Distilled water | ml | 10.0 |
| "Sorbo" (70% sorbitol-30% water), q. s. to 100.0 ml. | | |

Example 8

| | | |
|---|---|---|
| Ascorbic acid, U. S. P. | gm | 1.0 |
| Ferrous sulfate, U. S. P. | gm | 6.0 |
| Invert sugar | gm | 40.0 |
| Distilled water | ml | 10.0 |
| "Sorbo" (70% sorbitol-30% water), q. s. to 100.0 ml. | | |

Example 9

| | | |
|---|---|---|
| Ascorbic acid, U. S. P. | gm | 1.0 |
| Ferrous sulfate, U. S. P. | gm | 6.0 |
| Methyl Paraben | gm | 0.025 |
| Propyl Paraben | gm | 0.005 |
| Oil of peppermint | gm | 0.05 |
| F. D. C. Yellow #6 | gm | 0.001 |
| F. D. C. Green #3 | gm | 0.0008 |
| Distilled water | ml | 10.0 |
| "Sorbo" (70% sorbitol-30% water), q. s. to 100.0 ml. | | |

Example 10

| | | |
|---|---|---|
| Ascorbic acid, U. S. P. | gm | 1.0 |
| Ferrous gluconate, N. F. | gm | 8.0 |
| Distilled water | ml | 10.0 |
| "Sorbo" (70% sorbitol-30% water), q. s. to 100.0 ml. | | |

Example 11

| | | |
|---|---|---|
| Ascorbic acid, U. S. P. | gm | 1.0 |
| Ferrous sulfate, U. S. P. | gm | 6.0 |
| Sorbitol | gm | 70.0 |
| Distilled water, q. s. to 100.0 ml. | | |

Example 12

| | | |
|---|---|---|
| Ascorbic acid, U. S. P. | gm | 1.0 |
| Ferrous sulfate, U. S. P. | gm | 6.0 |
| Glycerin, U. S. P. | gm | 8.0 |
| Distilled water | ml | 5.0 |
| "Sorbo" (70% sorbitol-30% water), q. s. to 100.0 ml. | | |

Example 13

| | | |
|---|---|---|
| Ascorbic acid, U. S. P. | gm | 1.0 |
| Ferrous sulfate, U. S. P. | gm | 6.0 |
| Citric acid, U. S. P. | gm | 1.0 |
| Glycerin, U. S. P. | gm | 8.0 |
| Distilled water | ml | 5.0 |
| "Sorbo" (70% sorbitol-30% water), q. s. to 100.0 ml. | | |

Example 14

| | | |
|---|---|---|
| Ascorbic acid, U. S. P. | gm | 3.0 |
| Ferrous lactate hydrate | gm | 6.0 |
| Propylene glycol, U. S. P. | gm | 8.0 |
| Distilled water | ml | 5.0 |
| "Sorbo" (70% sorbitol-30% water), q. s. to 100.0 ml. | | |

Example 15

| | | |
|---|---|---|
| Ascorbic acid, U. S. P. | gm | 1.0 |
| Ferrous sulfate, U. S. P. | gm | 6.0 |
| Mannitol | gm | 25.0 |
| Distilled water, q. s. to 100.0 ml. | | |

Example 16

| | | |
|---|---|---|
| Ascorbic acid | gm | 1.0 |
| Ferrous sulfate | gm | 6.0 |
| Citric acid | gm | 1.0 |
| Glycerin | gm | 60.0 |
| Mannitol (20% aqueous solution), q. s. to 100.0 ml. | | |

It is not desired to be limited except as set forth in the following claims.

What is claimed is:

1. An aqueous iron-ascorbic acid preparation comprising: a member selected from the group consisting of ferrous sulfate, ferrous lactate, ferrous gluconate, ferrous succinate, ferrous glutamate, and ferrous choline citrate; l-ascorbic acid, water, and from about 15% to about 90% by weight of a member selected from the group consisting of sorbitol and mannitol.

2. An aqueous iron-ascorbic acid preparation comprising: ferrous sulfate, l-ascorbic acid, water and from about 15% to about 90% by weight of sorbitol.

3. An aqueous iron-ascorbic acid preparation comprising: ferrous gluconate, l-ascorbic acid, water and from about 15% to about 90% by weight of sorbitol.

4. An aqueous iron-ascorbic acid preparation comprising: ferrous lactate, l-ascorbic acid, water and from about 15% to about 90% by weight of sorbitol.

5. An aqueous iron-ascorbic acid preparation comprising: ferrous sulfate, l-ascorbic acid, water and from about 60% to about 75% by weight of sorbitol.

6. An aqueous iron-ascorbic acid preparation comprising: ferrous gluconate, l-ascorbic acid, water and from about 60% to about 75% by weight of sorbitol.

References Cited in the file of this patent

Howard: Modern Drug Encycl., 4th ed., 1949, p. 941.
Bandelin: Jour. of the Am. Pharm. Asso., Sci. Ed., vol. 44, No. 4, April 1955, pp. 241–244.